(No Model.)

D. A. CARPENTER.
FASTENING FOR COATS, GLOVES, &c.

No. 568,520. Patented Sept. 29, 1896.

WITNESSES:
Edward C. Rowland.
F. B. Packard.

INVENTOR—
Daniel A. Carpenter

UNITED STATES PATENT OFFICE.

DANIEL A. CARPENTER, OF NEW YORK, N. Y.

FASTENING FOR COATS, GLOVES, &c.

SPECIFICATION forming part of Letters Patent No. 568,520, dated September 29, 1896.

Application filed April 22, 1895. Serial No. 546,656. (No model.)

*To all whom it may concern:*

Be it known that I, DANIEL A. CARPENTER, of New York city, in the county and State of New York, have invented a certain new and useful Improvement in Fastenings for Coats, Gloves, and other Articles, of which the following is a full, clear, and exact description, reference being made to the accompanying drawings, forming part of this specification.

This invention relates to improvements in separable fastening devices, which are composed of a member resembling a button and comprising a socket, and of a member, namely, a stud, with which the socket engages, each of which members is adapted to be secured to the article whose parts it is desired to fasten together; and the invention consists of a fastening device having the socket member and stud constructed substantially as is hereinafter described and claimed.

Figure 1:
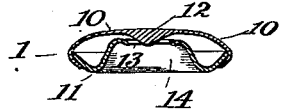
Figure 6:
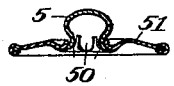
Figure 2:
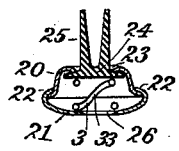
Figure 7:
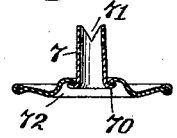
Figure 3:
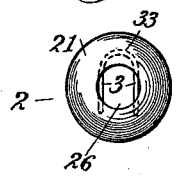
Figure 8:
Figure 4:
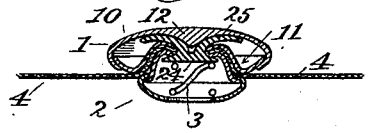
Figure 9:
Figure 5:
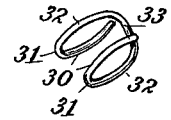
Figure 10:
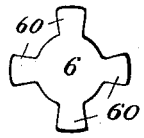
Figure 11:
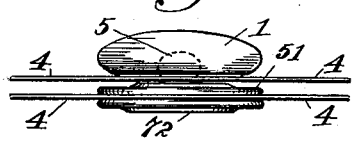

On the accompanying sheet of drawings, Figure 1 is a cross-section of the dome of the socket member; Fig. 2, a cross-section of the socket provided with a rivet; Fig. 3, a face view of the socket; Fig. 4, a cross-section of the socket member secured to a garment; Fig. 5, a perspective of a spring which forms part of the socket; Fig. 6, a cross-section of the head of the stud and collar; Fig. 7, a cross-section of a tubular fastener whereby the head of the stud is riveted to the garment, the fastener being inserted in a washer; Fig. 8, a cross-section of the stud secured to a garment; Fig. 9, a view of the head of the stud alone; Fig. 10, a plan of the blank from which the head of the stud is formed; and Fig. 11 shows the entire fastening holding parts of a garment together.

Similar reference-numbers designate like parts in different views.

The particular parts of the fastening which it is the object of this invention to improve are the socket and the stud. The improvement in the socket especially concerns the formation of the spring, but it also involves the structure of the shell wherein the spring is confined, in connection with the rivet whereby the socket is attached to the dome.

The drawings represent the fastening as it appears when it is designed to be used on rubber coats. To render it suitable for gloves and other articles for which fastenings smaller than those used on such coats are required, it is merely necessary to reduce the size of the dome of the socket member and the size of the collar at the base of the stud and of the washer in which the rivet of the stud is inserted.

The dome 1 of the socket member consists of the top 10, resembling the top of a button, the lining 11, secured at its outer edge to the top, and a conical deflector 12, centrally located on the under side of the top and above the lining 11, the arrangement of the parts being that shown in Fig. 1. The top 10 and deflector 12 may be made in one piece, as shown, or in two pieces. The lining 11 has a central perforation 13, and contains a cavity 14, conforming to the upper part of the socket.

The socket 2 is a shell inclosing a spring of peculiar formation and provided with a rivet secured in and projecting from the top of the shell. The shell is made of two pieces 20 and 21. The shape of the upper piece 20 resembles that of a bell, and the lower piece 21 is preferably convexo-concave, as shown, although it may be flat, excepting near the edge 22, which is turned up and adapted to be pressed inward over the edge of the piece 20. The top of the latter piece is preferably flattened and slightly depressed, as shown at 23, and has a perforation centrally located therein. A rivet is inserted tightly in this perforation with its head 24 inside of the shell and its stem 25 projecting upward from the top of the shell. This rivet may be either a slotted steel rivet of the form shown in Fig. 2 or a tubular rivet. The piece 21, which becomes the face of the socket, has a central perforation or mouth 26 of proper size to allow the head of the stud to pass freely through it. When the parts of the shell are secured together, the spring 3 is held between the piece 21 and the head 24 of the rivet and the head of the rivet is held between the spring and the top of the piece 20. The spring is made from wire or a slender strip of metal. Piano-wire is considered the best material from which to make it. It is formed from a single piece of material and consists, essentially, of two loops alike in size and shape, arranged about an axis passing through the center of each loop and with the faces of the loops at right angles to the axis, and of a curved section extending from the upper side of one of the loops to the lower side of the other, or from the top to the bottom of the spring, as shown in Fig. 5 and in Figs. 2, 3, and 4. The sections 30 of the loops adjacent to the ends of the wire, one of which sections is at the top and the other at the bottom of the spring, are joined by bends 31 to the sections 32 at the bottom and top of the spring, respectively, and the latter sections are joined to each other by the section 33. The loops of the spring are normally separated by a distance less than the thickness of the head of the stud, and the spring receives the stud between the sections 30 and 32, which are at the bottom of the spring. Hence one only of the sections 30 is subject to any strain when the stud is held by the spring; but the other section 30 is useful, because it renders the spring equally efficient, no matter which of the sides, called the "top" and "bottom," may happen to be next to the face 3 of the socket when the fastening is finished, and because it helps to keep the spring and the rivet of the socket in their proper places, as will soon be explained.

The several parts of the socket are secured together, as will be understood from Fig. 2, by inserting the rivet in the top piece 20, as shown, dropping the spring either into the piece 20 or piece 21 and fastening those pieces to each other at their edges by bending inward the edge of the piece 21 over that of the piece 20. It will now be seen that the uppermost of the sections 30 of the spring helps to prevent the rivet from slipping down or into the shell when the socket is in the state represented in Fig. 2, and that it is furthermore adapted to help resist pressure on the spring from the bottom and thus prevent displacement of the spring in the shell. The size of the spring is such, in relation to the interior of the shell, that it is always kept in its proper position, where it is adapted to bear against the stud on opposite sides of the mouth 26 of the socket, as shown in Figs. 3 and 4.

The socket member is attached to a garment or other article 4 by means of a press, the socket being supported in the press by a tool that extends through the mouth 26 of the socket and through the spring to the head 24 of the rivet. The rivet is passed through the article 4 and driven against the deflector 12 in the dome, whereby the parts of its stem are spread outward therein between the top 10 and lining 11, and a portion of the material of the article 4 and the upper part of the socket are pressed into the recess 14 in the dome, as indicated in Fig. 4.

The member of the fastening termed the "stud" consists of a spheroidal head and means of attaching it to the article to which the fastening is to be applied. To the head 5, which is provided with tangs 50, is secured a collar 51, by inserting the neck of the stud formed by the tangs in the collar and bending the tangs outward on the under side of the collar. This collar constitutes the base of the stud proper. Fig. 9 represents the head before it is attached to the collar, its main part or top and the tangs 50 being formed, respectively, from the central portion 6 and projections 60 of the blank, as indicated in Fig. 10. The rivet of the stud has a tubular stem 7, at one end of which is a flange 70 and in the other end of which are two notches. One of these notches is shown at 71 and the other is diametrically opposite to it on the side of the stem which is not shown. They are of the same size and their depth is substantially equal to one-half the diameter of the stem. This rivet is ordinarily inserted in a washer 72, which forms practically an enlargement of the flange 70; but when the fastening is designed for gloves, for example, the flange 70 may be made large enough to render such a washer unnecessary.

The attachment of the stud to a garment or other article, as illustrated in Fig. 8, is effected by passing the stem of the rivet through the material 4 and forcing the notched end of the rivet against the top of the head by means of a press in which the parts of the stud are held. The tool on which the rivet rests should extend into the stem of the rivet from one-third to one-half the length of the stem in order to properly support it. The top of the head serves as a die against which the rivet is clenched. The parts between the notches of the stem of the rivet are bent inward by contact with the curved surface presented by the top of the head until their edges meet. Then the part of the stem adjacent to the notches is crushed or buckled by the pressure and bulges outward on opposite sides, so that it cannot be withdrawn through the neck of the stud, or so that the head is fastened securely by the rivet to the material 4.

When the members of the fastening are in engagement with each other, as indicated in Fig. 11, the stud extends through the mouth 26 of the socket and is held on opposite sides of its neck by the spring 3, close to the face of the socket. The top of the head of the stud then rests close to the rivet-head 24, between the upper sides of the loops of the spring. A spring of the form described has much greater elasticity than any of those commonly found in fastenings similar to this, and has sufficient strength to hold the stud securely in the socket. A lateral strain on the fastening is borne largely by the face of the socket in contact with the stud on one side of the mouth 26, so there is no danger that such a strain might weaken or destroy the spring.

Having thus described my invention, what I claim as new, and desire to secure by Letters Patent, is—

1. A fastening device composed of a spring socket member and a stud, and comprising a shell and means for attaching the same to a garment or other article, and a spring formed from a single strip of material and inclosed in the shell and having a section 30 and a section 32 at the bottom, and another section 32 at the top, and having bends connecting the bottom sections at opposite ends with the top section 32, substantially as described.

2. A fastening device composed of a spring socket member and a stud, and comprising a shell and means for attaching the same to a garment or other article, and a spring formed of a single strip of material and inclosed in the shell and having sections 30 and 32 at the bottom, and sections 30 and 32 at the top, and having a bend 31 connecting each section 30 with the adjacent section 32, and a bend 33 connecting the sections 32 with each other, substantially as described.

3. A fastening device composed of a spring socket member and a stud, and comprising a shell provided with a rivet having its head 24 inside the shell and against the top thereof and its stem projecting upward through the top, and a spring formed from a single strip of material and inclosed in the shell and having sections 30 and 32 at the bottom, and sections 30 and 32 at the top, and having a bend 31 connecting each section 30 with the adjacent section 32, and a bend or section 33 connecting the sections 32 with each other, and having a bearing at the top against the head 24 of the rivet and at the bottom against the inner surface of the face of the shell, substantially as described.

4. A fastening device composed of a spring socket member and a stud, and comprising a shell and means for attaching the same to a garment or other article, and a spring formed from a single strip of material and inclosed in the shell and having two oblong loops alike in size and shape arranged about an axis passing through the center of each loop and with the faces of the loops at right angles to the axis and their upper and lower edges in contact with the top and bottom of the shell respectively, and having a curved section connecting the loops with each other at one end of the spring, substantially as described.

5. A fastening device composed of a spring socket member and a stud, and comprising a stud having a hollow head with a convex outer surface and a concave inner surface at the top, and having tangs 50 and a collar secured to the head by the tangs, and a rivet having a tubular stem open at both ends and provided with a flange 70 at one end and with two notches 71 diametrically opposite to each other in the other end, the stem of the rivet being adapted to enter the head of the stud and make contact with the concave inner surface at the top of the head, substantially as described.

DANIEL A. CARPENTER.

In presence of—
   CHAS. COLEMAN MILLER,
   F. B. PACKARD.